(12) United States Patent
Shoham et al.

(10) Patent No.: US 9,742,919 B2
(45) Date of Patent: Aug. 22, 2017

(54) OUTBOUND CALLING CENTER INVENTORY MANAGEMENT

(71) Applicant: ARS National Services, Inc., Escondido, CA (US)

(72) Inventors: Dan Shoham, Encinitas, CA (US); Arleigh Reyna, Wildomar, CA (US); Sam Spratt, Escondido, CA (US)

(73) Assignee: ARS NATIONAL SERVICES, INC., Escondido, CA (US)

( * ) Notice: Subject to any disclaimer, the term of this patent is extended or adjusted under 35 U.S.C. 154(b) by 0 days.

(21) Appl. No.: 14/530,432

(22) Filed: Oct. 31, 2014

(65) Prior Publication Data
US 2015/0117633 A1    Apr. 30, 2015

Related U.S. Application Data

(60) Provisional application No. 61/898,146, filed on Oct. 31, 2013.

(51) Int. Cl.
*H04M 3/00* (2006.01)
*H04M 5/00* (2006.01)
*H04M 3/523* (2006.01)
*H04M 3/51* (2006.01)
*G06Q 10/06* (2012.01)
*H04L 12/66* (2006.01)

(52) U.S. Cl.
CPC ...... *H04M 3/5232* (2013.01); *G06Q 10/0631* (2013.01); *H04M 3/5158* (2013.01); *H04M 2203/402* (2013.01)

(58) Field of Classification Search
CPC .... G06Q 40/02; G06Q 40/025; G06Q 20/102; G06Q 20/14; G06Q 40/12; G06Q 30/0269; G06Q 30/04; G06Q 10/06393; G06Q 20/02; G06Q 20/22; G06Q 30/0224; G06Q 30/016; H04M 3/5175; H04M 2203/401; H04M 3/5158; H04M 3/5191; H04M 3/4365; H04M 3/51
USPC ........ 379/265, 266, 265.12, 265.02, 265.09, 379/265.11, 265.01, 265.05, 265.06, 379/265.13, 266.01, 266.02; 705/36 R, 705/40, 35, 2
See application file for complete search history.

(56) References Cited

U.S. PATENT DOCUMENTS

| | | | |
|---|---|---|---|
| 5,436,965 A * | 7/1995 | Grossman et al. | 379/266.08 |
| 7,873,157 B1 * | 1/2011 | Sim | 379/266.08 |
| 7,899,707 B1 * | 3/2011 | Mesaros | G06Q 30/02 705/1.1 |
| 8,126,133 B1 * | 2/2012 | Everingham | G06Q 10/063112 379/265.01 |

(Continued)

*Primary Examiner* — Ahmad F Matar
*Assistant Examiner* — Kharye Pope
(74) *Attorney, Agent, or Firm* — Procopio Cory Hargreaves and Savitch LLP; Pattric Rawlins; Jonathan Cheng

(57) ABSTRACT

Systems and methods for optimizing inventory assignment amongst a plurality of Producers to achieve maximum revenue from a given inventory are provided. The system employs historical analysis of each producer's relative liquidation rate at a given percentage of capacity. The inventory is then assigned to the producers such that the anticipated relative liquidation rate for each producer working the inventory is substantially equal to a target relative liquidation rate.

12 Claims, 3 Drawing Sheets

(56) References Cited

U.S. PATENT DOCUMENTS

| | | | |
|---|---|---|---|
| 2003/0078881 A1* | 4/2003 | Elliott | G06Q 20/10 705/39 |
| 2003/0083917 A1* | 5/2003 | Tracey et al. | 705/7 |
| 2004/0019560 A1* | 1/2004 | Evans et al. | 705/40 |
| 2005/0080821 A1* | 4/2005 | Breil | G06Q 40/02 |
| 2006/0080236 A1* | 4/2006 | Welker | G06Q 20/10 705/40 |
| 2006/0085331 A1* | 4/2006 | Imrey | G06Q 20/10 705/39 |
| 2006/0218103 A1* | 9/2006 | Williams | G06Q 30/0283 705/400 |
| 2007/0043659 A1* | 2/2007 | Kass et al. | 705/38 |
| 2007/0116240 A1* | 5/2007 | Foley | H04M 3/5233 379/265.02 |
| 2007/0156557 A1* | 7/2007 | Shao | G06Q 10/06312 705/35 |
| 2007/0233780 A1* | 10/2007 | Shevlin | G06Q 10/06 709/203 |
| 2008/0077525 A1* | 3/2008 | Willey | G06Q 20/04 705/40 |
| 2008/0118051 A1* | 5/2008 | Odinak | H04W 4/12 379/265.09 |
| 2008/0189202 A1* | 8/2008 | Zadoorian et al. | 705/37 |
| 2009/0010410 A1* | 1/2009 | Anderson | G06Q 30/08 379/201.01 |
| 2009/0063311 A1* | 3/2009 | Allison, Jr. | G06Q 40/12 705/30 |
| 2009/0248481 A1* | 10/2009 | Dick et al. | 705/9 |
| 2010/0287093 A1* | 11/2010 | He | G06Q 40/025 705/38 |
| 2011/0178860 A1* | 7/2011 | Imrey et al. | 705/14.25 |
| 2011/0238616 A1* | 9/2011 | Aggarwal | G06Q 10/06 707/602 |
| 2012/0078813 A1* | 3/2012 | Rose | G06Q 40/06 705/36 R |
| 2012/0215585 A1* | 8/2012 | Loveday | G06Q 40/02 705/7.29 |
| 2013/0151383 A1* | 6/2013 | Gancarz et al. | 705/30 |
| 2013/0287202 A1* | 10/2013 | Flockhart | H04M 3/5232 379/265.12 |
| 2014/0081688 A1* | 3/2014 | Kotak | G06Q 10/06 705/7.14 |
| 2014/0081833 A1* | 3/2014 | Koop et al. | 705/38 |
| 2014/0119533 A1* | 5/2014 | Spottiswoode | H04M 3/523 379/265.11 |
| 2014/0355748 A1* | 12/2014 | Conway | H04M 3/523 379/265.1 |
| 2014/0372261 A1* | 12/2014 | Snyder | G06Q 40/12 705/30 |

* cited by examiner

OUTBOUND CALLING CENTER INVENTORY MANAGEMENT

RELATED APPLICATION

The present application claims priority to U.S. provisional patent application No. 61/898,146 filed 31 Oct. 2013, which is incorporated herein by reference in its entirety.

BACKGROUND

Field

The present disclosure is generally related to outbound calling centers and is more particularly related to systems and method for inventory management in outbound calling centers.

Related Art

Conventional outbound calling centers such as a contingency debt collection agency typically have a plurality of producers that are each assigned various accounts from which to gain earnings, such as through the collection of debts owed. When an inventory of accounts is assigned to the outbound calling center, each producer is in turn assigned a portion of the total inventory. These producers are not identical in their effectiveness or capacity.

Conventional methods of inventory assignment are largely based on the concepts of capacity and incentives. Capacity refers to the amount of inventory a producer can process in a unit of time. Incentives refer to a system where superior performance by a producer is subsequently rewarded with additional inventory assignment or higher-quality inventory assignment. In these conventional methods, producers are assigned inventory based on their capacity, and are incentivized to increase their capacity or performance with the promise of additional or higher-quality subsequent inventory.

SUMMARY

The inventors have recognized that existing methods of inventory assignment fail to recognize that some accounts are so valuable so as to be economically worthy of being worked and re-worked beyond simple capacity assignment, even at the expense of not working less valuable accounts at all. Additionally, the inventors have recognized that existing methods of inventory assignment also fail to take advantage of the dynamic prioritization strategies that producers naturally use as the inventory assigned to them is increased above capacity or decreased below capacity.

Accordingly, described here are systems and methods to assign inventory amongst producers in a manner that will maximize the overall enterprise earnings. The present disclosure defines and interconnects the concepts of fee value and compression.

Fee value refers to measuring inventory based on the statistically projected earnings it would generate if worked normally rather than measuring inventory based on the production capacity required to work it. The fee value of an individual account is the expected earnings the account would generate if worked normally; the fee value of an inventory of accounts is the sum of the fee value of all the individual accounts comprising that inventory.

Compression refers to the observed behavior that a producer, when assigned more accounts than his or her capacity, will prioritize accounts with the highest fee value per unit effort and conversely, when assigned fewer accounts than capacity, the producer will invest excess capacity to further work and re-work the most promising accounts. Observed compression behaviors combine effects such as cherry-picking, ditching, under-working, and other behaviors where the producers extract less value from each account so they can work more accounts and extract more value overall. Observed de-compression behaviors combine opposite effects: deep digging, persevering, and account maximization. Whereas compressed producers work more inventory than normally, they do so at the expense of reduced relative liquidation rate; and, likewise, de-compressed producers have improved relative liquidation rate, but do so at the expense of working a smaller inventory. In this description, the term compression behavior includes both of the above described compression and de-compression behaviors.

The present disclosure provides adaptive systems and methods to distribute the accounts in an inventory amongst producers, taking into consideration the compression behavior, so as to optimize the overall earnings realized from the inventory and thereby increase overall earnings. One particular advantage of the systems and methods described herein is higher earnings, for instance debt collection fees, generated using the same producer resources.

Although the primary embodiment described herein is directed toward debt collection agencies, other embodiments are envisioned by the inventors including but not limited to telemarketing, charitable fund raising, political contribution solicitations and other outbound calling centers, just to name a few. Furthermore, the inventors additionally contemplate that an expanded concept of fee value, for example to include non-financial meters of success, for instance political, religious or other conversions, recruitment for focus groups, recruitment for clinical trials and recruitment for class action lawsuits or other groups and/or vocations, just to name a few. The systems and methods described herein can be employed by outbound calling centers engaged in such activities.

In practice, a statistical method is first used to estimate the fee value of each individual account if worked normally. The estimated fee value is based on information available prior to the account being assigned to a producer. For example, for a contingency debt collection account, the fee value might be calculated as the product of the balance owed, the known liquidation rate for accounts of comparable score, and the contingency rate.

Second, each producer's recent historical performance is analyzed to determine, for each individual producer, the earnings of each individual producer as a function of how much inventory (measured by total fee value) was assigned to each producer. For example, a relationship such as a power-law can be developed to facilitate this analysis. In one embodiment, particularly useful if the number of historical periods available for analysis is limited, employs the same relationship for all producers with only a scalar multiplier magnitude (producer effectiveness) characterizing their differences. For example, a one-third-power-law, where earnings is proportional to the one-third-power of the increase (or decrease) in inventory under compression (or de-compression) conditions, has been observed for all producers by the inventors.

Third, the total earnings based on the assignment of accounts in an inventory amongst producers is computed. In one embodiment, the developed relationship is assumed to continue to be applicable. Advantageously, the systems and methods described herein employ the inventors' observation that at the point of optimal assignment of inventory to producers, each producer will achieve substantially the same relative liquidation rate. This is contrary to conventional inventory assignment but the inventors have recognized that if inventory is assigned in a manner that allows any producer to achieve a higher relative liquidation rate than another, then moving a small amount of inventory from the lower-to-higher relative liquidation rate producer would increase earnings since the moved inventory would now generate more earnings than before; and hence the original inventory assignment is proven to not have been optimal. As will be understood by those skilled in the art, the small amount of inventory moved is not sufficient in itself to materially change the workload or the corresponding compression and relative liquidation rate of the producers. Accordingly, if the inventory is assigned so that there is no producer with a higher relative liquidation rate, then there is no increase in earnings achieved by moving inventory and optimal inventory assignment has been achieved.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Figure 1:
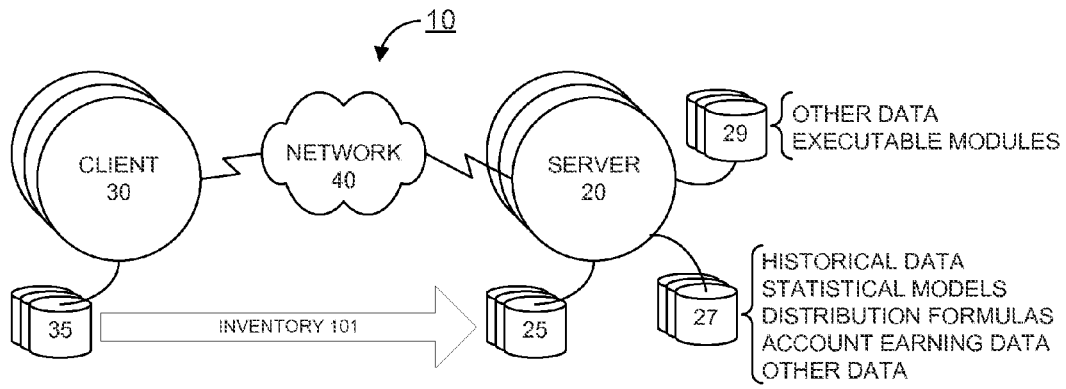
FIG. 1 is a block diagram illustrating an example system for outbound calling center inventory management according to an embodiment.

Certain embodiments disclosed herein provide systems and methods for optimizing inventory assignment amongst a plurality of producers to achieve maximum revenue from a given inventory. For example, one method disclosed herein allows for historical analysis of each producer's relative liquidation rate at a given percentage of capacity. The inventory is then assigned to the producers such that the anticipated relative liquidation rate for each producer working the inventory is substantially equal to a target relative liquidation rate. In one embodiment, substantially equal is within 1%. In an alternative embodiment, substantially equal is within 3%. In an alternative embodiment, substantially equal is within 5%.

The systems and methods described herein provide a significant advantage over conventional inventory assignment because they capitalize on the inventors' recognition, observation and formulation of the compression behaviors exhibited by producers. The compression behaviors, once understood and formulated, become the driver of the distribution algorithm methodology. It is important to note that there are multiple behavior patterns, including cherry picking, ditching, under-working, deep digging, persevering, and account maximization that are associated with compressed and de-compressed behavior; and that the systems and methods described herein specifically make no attempt to measure, control, regulate, or manage any of these behavior patterns individually. Rather, the systems and methods described herein allow each producer to continually optimize and prioritize his or her own activities with respect to compression and quantifies each producer's historical results to optimize inventory distribution amongst a plurality of producers that each employ his or her own combination of compression behaviors.

The systems and methods described herein also provide a significant advantage over conventional inventory assignment because they capitalize on the inventors' recognition, observation and formulation of the fee value concept as a measure of inventory quantity rather than more traditional measures such as total balance or number of accounts. The use of the fee value concept is based upon the inventors' recognition that compression and de-compression are relevant to the evaluation of the quality of the inventory being assigned and that quantity alone should not form the basis of the evaluation of the quality of the inventory being assigned.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

FIG. 1 is a block diagram illustrating an example system 10 for outbound calling center inventory management according to an embodiment. In the illustrated embodiment, the system 10 comprises one or more inventory management server servers 20 connected to one or more clients 30 via a network 40. Each of the servers 20 are configured with one or more local and/or remote data storage areas 25, 27 and 29. The data storage areas 25, 27 and 29 may include a variety of information and data and computer instructions for execution or interpretation, including historical data (e.g., account, collection and producer data), statistical model data, distribution formula data, account earning data, executable modules, inventory and account data, and any other data. Each of the clients 30 are also configured with one or more local and/or remote data storage areas 35. The client data storage area 35 may include a variety of information and data and computer instructions for execution or interpretation, including a plurality of accounts that collectively are one or more inventories 101.

In one embodiment, a client 30 may be the owner of a plurality of consumer debt accounts that are provided to a server 20, e.g., via network 40 or via some other digital medium, so that the consumer debt accounts in the inventory 101 may be worked by producers in order to collect revenue from consumers owing the debts. The server 20 analyzed historical data related to the inventory to determine a fee value for each individual account in the inventory. The server 20 also uses historical data related to each producer working the inventory to determine a relative liquidation rate for each producer. The server 20 then distributes the accounts in the inventory to the producers in a fashion that drives the relative liquidation rate of each producer to be substantially equal to the relative liquidation rate of all other producers. For example, a producer with a higher relative liquidation rate is assigned more inventory than a producer with a lower relative liquidation rate in order to drive both relative liquidation rates to be substantially equal.

Figure 2:
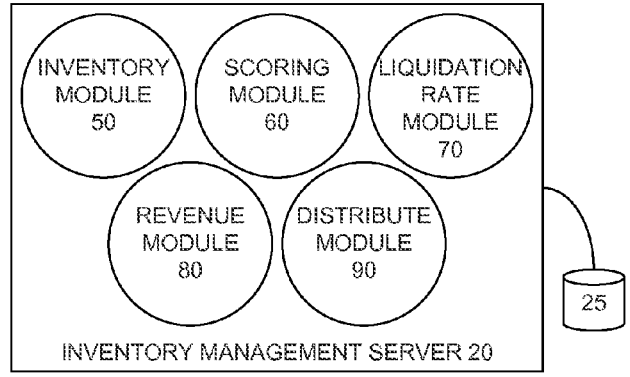
FIG. 2 is a block diagram illustrating an example inventory management server according to an embodiment.

FIG. 2 is a block diagram illustrating an example inventory management server 20 according to an embodiment. In the illustrated embodiment, the server 20 comprises an inventory module 50, a scoring module 60, a liquidation rate module 70, a revenue module 80 and a distribution module 90. As previously discussed, the server 20 is configured with one or more data storage areas 25.

The inventory module 50 is configured to obtain inventory for processing and distribution to producers. Inventory comprises a plurality of accounts and each account has related account data that provides detailed information about the account. In an embodiment directed toward the debt collection industry, the account data may include an identifier, a debt balance, contact information for the consumer owing the debt, a score that quantifies the likelihood of payment from the consumer, fee information and other account details as might be helpful or necessary.

The inventory module 50 may obtain inventory from a plurality of sources. In one embodiment the inventory module 50 obtains inventory from a client via a network. Alternatively, inventory may be received from a client via another digital medium or electronic communication interface. Advantageously, inventory module 50 is configured to obtain the inventory and store the inventory in data storage area 25 for further processing and distribution to producers.

The scoring module 60 is configured to obtain a score for each account in an inventory. The scoring module 60 is also configured to determine or calculate an original score or a modified score for each account in an inventory. For example, certain inventory obtained by the inventory module 50 may include an original score in the account data for each account. Accordingly, the scoring module 60 may refine the original score using historical data from the particular industry that is related to the inventory. Such historical data can be stored in data storage area 25.

In an alternative embodiment, certain inventory obtained by the inventory module 50 may not include any score in the account data for each account. Accordingly, the scoring module 60 may calculate a score for each account using historical data from the particular industry that is related to the inventory. Such historical data can be stored in data storage area 25. In such an embodiment, the scoring module 60 may update the account data for each account by storing the calculated score with the account data for each account.

Alternatively, the scoring module 60 may obtain a score for each account from a third party service that provides account scores. In such an embodiment, the scoring module 60 may update the account data for each account by storing the obtained score with the account data for each account. Updating the account data with a score from a third party service may include inserting the obtained score where no score previously existed or replacing an existing score with the obtained score.

In one embodiment, the scoring module 60 may work cooperatively with the liquidation rate module 70 to convert scores to a base liquidation rate for each account. For example, the liquidation rate module 70 may provide specific liquidation rate information based on one or more historical streams of account data and corresponding collection information that is relevant to the specific inventory. The scoring module 60 may use the specific liquidation rate information to convert an original account score or an obtained account score or a calculated account score to a base liquidation rate for an account. In an alternative embodiment, the scoring module 60 may also use information from the liquidation rate module 70 to calculate a score for an account that did not include an original score when obtained by the inventory module 50.

The liquidation rate module 70 is configured to determine average and specific liquidation rates. For example, the liquidation rate module 70 analyzes historical collection data across all accounts processed by the server 20 to determine for each possible account score a global liquidation rate across all accounts, streams and inventories. In one embodiment, the liquidation rate module 70 separates all historical inventory into streams. A stream is a subset of closely related inventory. For example, a stream may comprise inventory that is specific to a particular industry or that is specific to a particular client or that is specific to a particular brand of credit card. As will be understood by the skilled artisan, streams can be defined using a variety of characteristics and time periods. Advantageously, the liquidation rate module 70 is configured to employ various parameters to define a stream and thereafter the liquidation rate module 70 is configured to analyze the accounts in the stream to determine for each possible account score a specific liquidate rate for that particular stream. Accordingly, the liquidation rate module 70 is configured to parse global inventory into a plurality of streams and determine and store and periodically update specific liquidation rate information for each possible account score in each stream.

For example, the liquidation rate module 70 module may determine that the global liquidation rate for an account score of 625 is 3.5%. Additionally, the liquidation rate module 70 module may determine that the specific liquidation rate for an account score of 625 in a first stream is 4.5%. Additionally, the liquidation rate module 70 module may determine that the specific liquidation rate for an account score of 625 in a second stream is 5.5%. Advantageously, the liquidation rate module periodically analyzes historical account data to update the global liquidation rates for account scores and the specific liquidation rates for various streams. In one embodiment, when processing inventory that is unfamiliar to the server 20, the liquidation rate module 70 uses the global liquidation rate when converting account scores to liquidation rates and when processing inventory that is familiar to the server 20, the liquidation rate module 70 uses a specific liquidation rate when converting account scores to liquidation rates.

The revenue module 80 is configured to determine actual revenue generated by working inventory. The revenue module 80 is also configured to determine estimated revenue generated by working inventory. For example, the revenue module 80 analyzes collection information for a plurality of account in an inventory to determine a total revenue generated by the inventory. Other revenue related information can also be determined by the revenue module 80 such as average collection per account. The revenue module 80 may also determine revenue information for a subset of an inventory, for example a particularly defined stream during a particular time period.

The revenue module 80 is also configured to determine estimated revenue to be generated by working an inventory. Advantageously, the revenue module 80 may use account score information in combination with a global or specific liquidation rate information and contingency information to determine an estimated revenue for a single account and then aggregate estimated revenue across all accounts in an inventory to determine an estimated revenue for an inventory.

The distribution module 90 is configured to distribute inventory to a plurality of producers. In one embodiment, the distribution module 90 dynamically distributes inventory to a plurality of producers in real time as the producers work the accounts in an inventory. The distribution module 90 analyzes account data for each account in an inventory and monitors the individual liquidation rate of each producer working the inventory and assigns higher or lower volumes of inventory with higher or lower estimated revenues to each producer in order to drive the liquidation rate of each producer to the substantially same liquidation rate.

Figure 3:
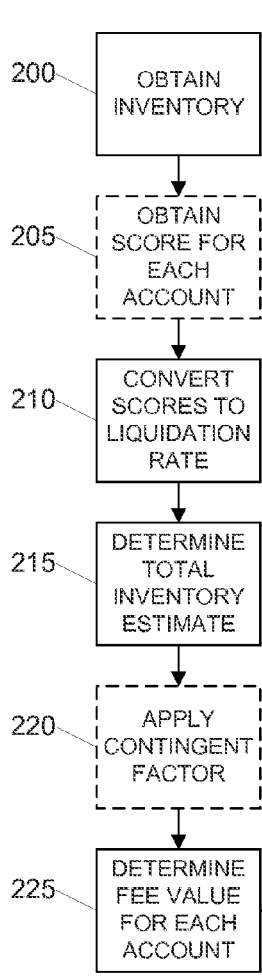
FIG. 3 is a flow diagram illustrating an example method for outbound calling center inventory management according to an embodiment.

FIG. 3 is a flow diagram illustrating an example method for outbound calling center inventory management according to an embodiment. In one embodiment, the illustrated method can be carried out in a system such as previously described with respect to FIG. 1. The illustrated method can also be carried out by an inventory management server as previously described with respect to FIG. 2.

Initially, the server obtains inventory in step 200. The inventory comprises a plurality of individual accounts. Each account has certain data that allows a producer to work the account and generate revenue. For example, each account may include contact information, an outstanding balance, a score and other information. In one embodiment, the server obtains a score for each account in the inventory as shown in optional step 205. The score for each account may be obtained from a third party resource or may be determined by the server based on historical data. Such historical data may be obtained by the server from local data storage or may be provided by a third party.

Next, in step 210 the score for each account is converted to a base liquidation rate by the server. The conversion can be this can be done in alternative ways. For example, the score can be converted based on historical analysis of liquidation rate information for: (a) all accounts for which the server can obtain historical data; or (b) a subset of the accounts for which the server can obtain historical data (a subset of historical accounts may also be referred to herein as a "stream"). Advantageously, streams can be defined in a variety of ways, for example, all accounts for a particular industry or all accounts for a particular industry for a period of time (e.g., the last two years). The more precisely a stream can be related to the accounts in the inventory obtained in step 200, the more germane the historical liquidation rate information is for the accounts in the inventory obtained in step 200. This translates into a more accurate base liquidation rate being produced in step 210 when converting each score on each account to a base liquidation rate.

In one embodiment, historical analysis is periodically performed and the resulting global and/or specific liquidation rates are stored in a memory. For example, the global and specific liquidation rates can be stored in a lookup table along with their corresponding account scores, e.g., account scores from 450-800.

Next, in step 215 the server determines the total inventory estimate. This may be determined by multiplying the balance of each account by its base liquidation rate and then summing the results across the entire inventory. Once a total inventory estimate has been determined, the total inventory estimate is multiplied by a contingency factor (e.g., the percent commission to be paid) in step 220 and subsequently in step 225 the server determines a fee value for each account. Finally, in step 230 the server distributes the accounts to each producer in a fashion designed to substantially equalize the liquidation rate of each producer.

Figure 4:
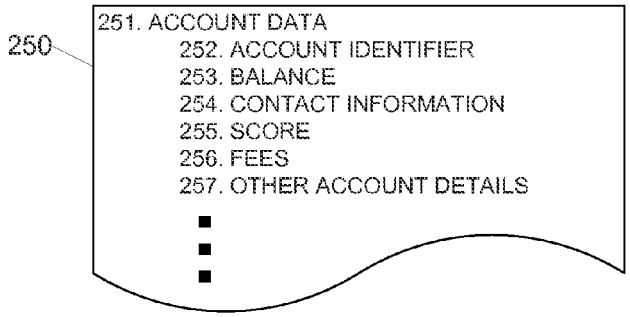
FIG. 4 is a block diagram illustrating an example account according to an embodiment.

FIG. 4 is a block diagram illustrating an example account 250 according to an embodiment. In one embodiment, the account may be part of an incoming inventory. In the illustrated embodiment, individual account 250 comprises accounts data 251, which may include including (among other data): (a) a unique account identifier 252 utilized for organization purposes; (b) a balance 253, for example the debt owed; (c) contact information 254 to allow the producer to contact the person or entity responsible for the account (e.g., a consumer), for example a phone number or information that will allow an investigative process, such as an industry-standard skip-trace process, to determine the phone number; (d) a score 255, such as a propensity to pay score; (e) fees 256, such as the collection agency contingency fees associated with the specific account; and optionally (f) other account details 257, which might include, for example, a history of the account.

Figure 5:
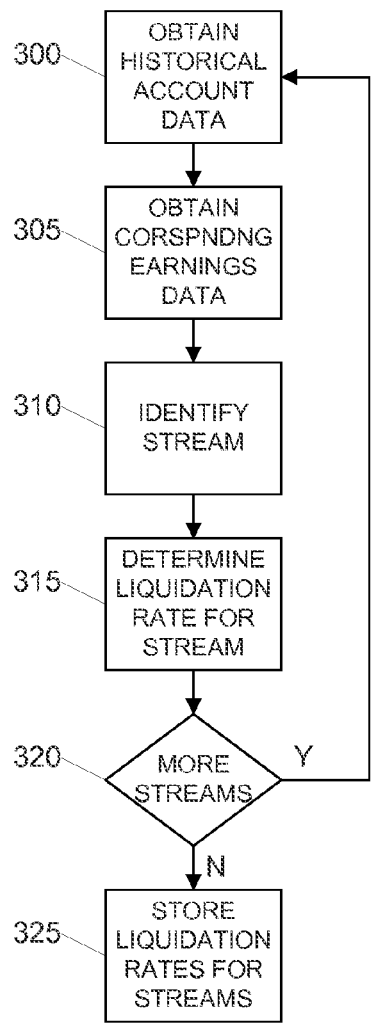
FIG. 5 is a flow diagram illustrating an example method for determining liquidation rates for streams of inventory according to an embodiment.

FIG. 5 is a flow diagram illustrating an example method for determining liquidation rates for streams of inventory according to an embodiment. In one embodiment, the illustrated method can be carried out in a system such as previously described with respect to FIG. 1. The illustrated method can also be carried out by an inventory management server as previously described with respect to FIG. 2.

Initially, the server obtains historical account data in step 300. In one embodiment the historical account data is obtained from a data storage area accessible by the inventory management server. Next, in step 305 the server obtains historical earnings data that corresponds to the historical account data. In one embodiment the historical earnings data is obtained from a data storage area accessible by the inventory management server.

Next, the server identifies a stream in step 310. The stream can be identified by a set of variable characteristics used to filter each account in the global inventory. If there is no filter, a global liquidation rate across all inventory is determined. The set of variable characteristics may also include a time range (e.g., last two years, since inception, etc.). Once a stream has been identified, a liquidation rate is determined for the stream as shown in step 315. For example, each account in the stream is analyzed in connection with its account balance and the amount actually collected for the account to determine the liquidation rate for the account. The collective liquidation rates for each account are then analyzed to calculate a liquidation rate for the identified stream. If there are more streams to be analyzed, as determined in step 320, the process repeats and in step 325 the liquidation rate for each analyzed stream is stored in a data storage area. The liquidation rate for a given stream can later be used to convert the score of an account in a new inventory to a base liquidation rate and also used to determine a total inventory estimate for a new inventory.

In one embodiment, computerized model building techniques such as linear regression, neural network, tabulation, non-linear regression, logistics regression, Bayesian analysis, principal components analysis, clustering algorithms, decision trees, genetic algorithms, Monte Carlo optimization methods, Ising algorithms, and Markov chains (other techniques may also be used) can be employed to analyze historical account data and corresponding earnings data to determine a liquidation rate for a stream. For example, certain parameters can be selected and statistically fitted to match the actual relationship between the historical accounts data and corresponding historical earning data to derive a relationship between an account in the particular stream and the liquidation rate for an account in that particular stream.

Accordingly, the server is configured to perform the analysis of the historical account and earning data to determine a fee value formula that statistically predicts, for each account in the historical accounts data the most likely corresponding earnings as captured in the corresponding historical accounts earning data. In one embodiment, the fee value formula is determined to be the product of the account balance, contingency fee, and the average liquidation rate for all global accounts with the same score. In an alternative embodiment, the fee value formula is determined to be the product of the account balance, contingency fee, and the average liquidation rate for all accounts in the same stream with the same score.

Figure 6:
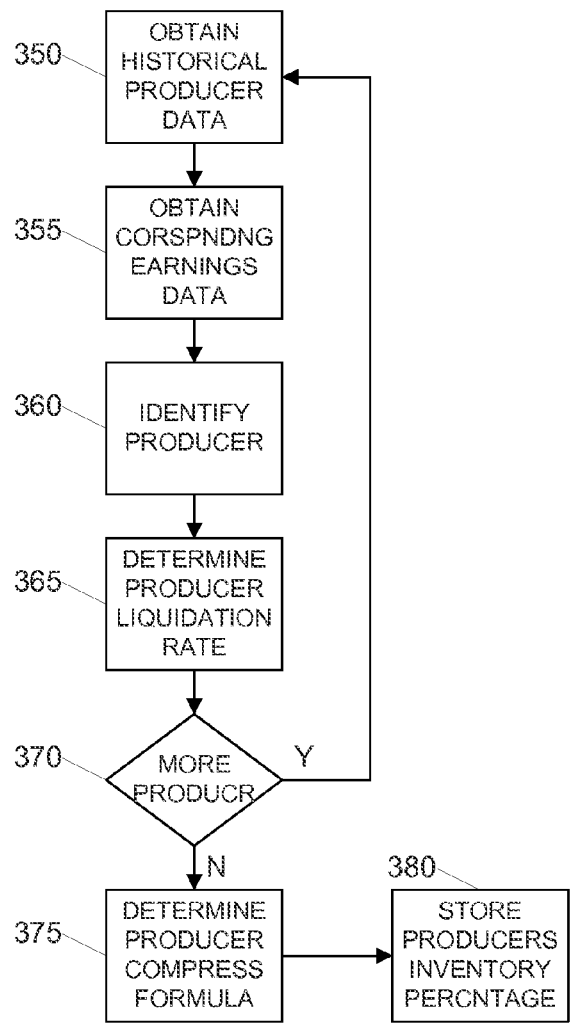
FIG. 6 is a flow diagram illustrating an example method for determining liquidation rates for producers according to an embodiment.

FIG. 6 is a flow diagram illustrating an example method for determining liquidation rates for producers according to an embodiment. In one embodiment, the illustrated method can be carried out in a system such as previously described with respect to FIG. 1. The illustrated method can also be carried out by an inventory management server as previously described with respect to FIG. 2.

Initially, the server obtains historical producer data in step 350. In one embodiment, producer data reflects the various compression strategies employed by producers to maximize revenue generated from accounts being worked. In one embodiment, the set of producers for which historical data is obtained is the current group of producers that will work a particular inventory. In one embodiment the historical producer data is obtained from a data storage area accessible by the inventory management server. Next, in step 355 the server obtains historical earnings data that corresponds to the historical producer data. In one embodiment the historical earnings data is obtained from a data storage area accessible by the inventory management server.

Next, in step 360 the server identifies a particular producer in the set of producers. The historical account data associated with the identified producer can be determined by a producer identifier associated in the data storage area as part of the historical account data for accounts that were worked by the particular producer. Alternatively, some other variable or characteristic may be used to associate each historical account with the producer who worked the account. Once a producer has been identified, the historical account and earnings data is analyzed to determine a liquidation rate for the producer as shown in step 365. For example, the historical earnings generated by the producer are analyzed in connection with the historical accounts worked by the producer to determine a liquidation rate for each producer. Advantageously, a producer's liquidation rate may be global across all accounts worked by the producer or it may be specific to a particular stream.

If there are more producers to be analyzed, as determined in step 370, the process repeats and in step 375 a compression formula is determined across all of the producers in the group. Next in step 380, the compression formula is applied to determine the percentage of inventory to be assigned to each producer and these percentages are stored in a data storage area. The inventory percentage for a given producer is later used to distribute accounts in an inventory to each producer in a fashion that results in all producers working a particular inventory having substantially equal relative liquidation rates. The advantage of all producers working a particular inventory having substantially equal relative liquidation rates is that the earnings from the particular inventory are optimized.

In one embodiment, computerized model building techniques such as linear regression, neural network, tabulation, non-linear regression, logistics regression, Bayesian analysis, principal components analysis, clustering algorithms, decision trees, genetic algorithms, Monte Carlo optimization methods, Ising algorithms, and Markov chains (other techniques may also be used) can be employed to analyze the historical producer data and corresponding earnings data to determine a compression formula. For example, certain parameters can be selected and statistically fitted to match the actual relationship between the historical compression data and corresponding historical earning data to derive a relationship between a producer and her compression strategies and corresponding account earnings.

Accordingly, the server is configured to perform the analysis of the historical compression and earning data to determine a compression formula that statistically predicts, for each producer in the set of producers, the most likely corresponding earnings as captured in the corresponding historical earning data, particularly focusing on the relationship between the compression ratio for the producer at various historical periods and the earnings the producer generated during each. In one embodiment, the compression formula is determined to be the product of the total fee value of the inventory assigned to the producer, the compression ratio raised to the power of negative-one-third, and the measured effectiveness of the producer.

Figure 7:
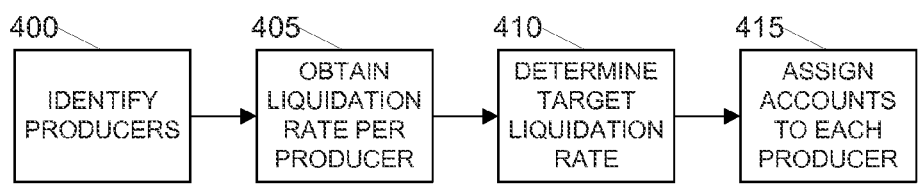
FIG. 7 is a flow diagram illustrating an example method for distributing inventory to maximize earnings according to an embodiment.

FIG. 7 is a flow diagram illustrating an example method for distributing inventory to maximize earnings according to an embodiment. In one embodiment, the illustrated method can be carried out in a system such as previously described with respect to FIG. 1. The illustrated method can also be carried out by an inventory management server as previously described with respect to FIG. 2.

Initially, the server identifies the set of producers that will work the inventory in step 400. Next, in step 405 the server obtains or determines the historical average liquidation rate for each producer in the set of producers. Subsequently, in step 410 the server determines a target relative liquidation rate for each producer that will work the inventory. Finally, in step 415 the server assigns accounts in the inventory to each producer.

The distribution of accounts in accordance with a target relative liquidation rate such that each producer working the inventory is provide a certain number of accounts based on his/her historical earnings performance for similar types of accounts provides a significant advantage for optimizing the revenue received from an inventory. In particular, each account in the inventory is analyzed to calculate a fee value (estimated revenue), for example using the process previously described with respect to FIG. 5. Subsequently, in combination with the calculated fee value for each account in an inventory, the accounts are distributed amongst the producers working the inventory in accordance with the target relative liquidation rate, for example using the process previously described with respect to FIG. 6. Using this combination of determining an accurate estimate of revenue for each account and an optimal distribution of accounts to generate substantially equal relative liquidation rates amongst all of the producers working the inventory advantageously produces maximum revenue from the inventory.

Figure 8:
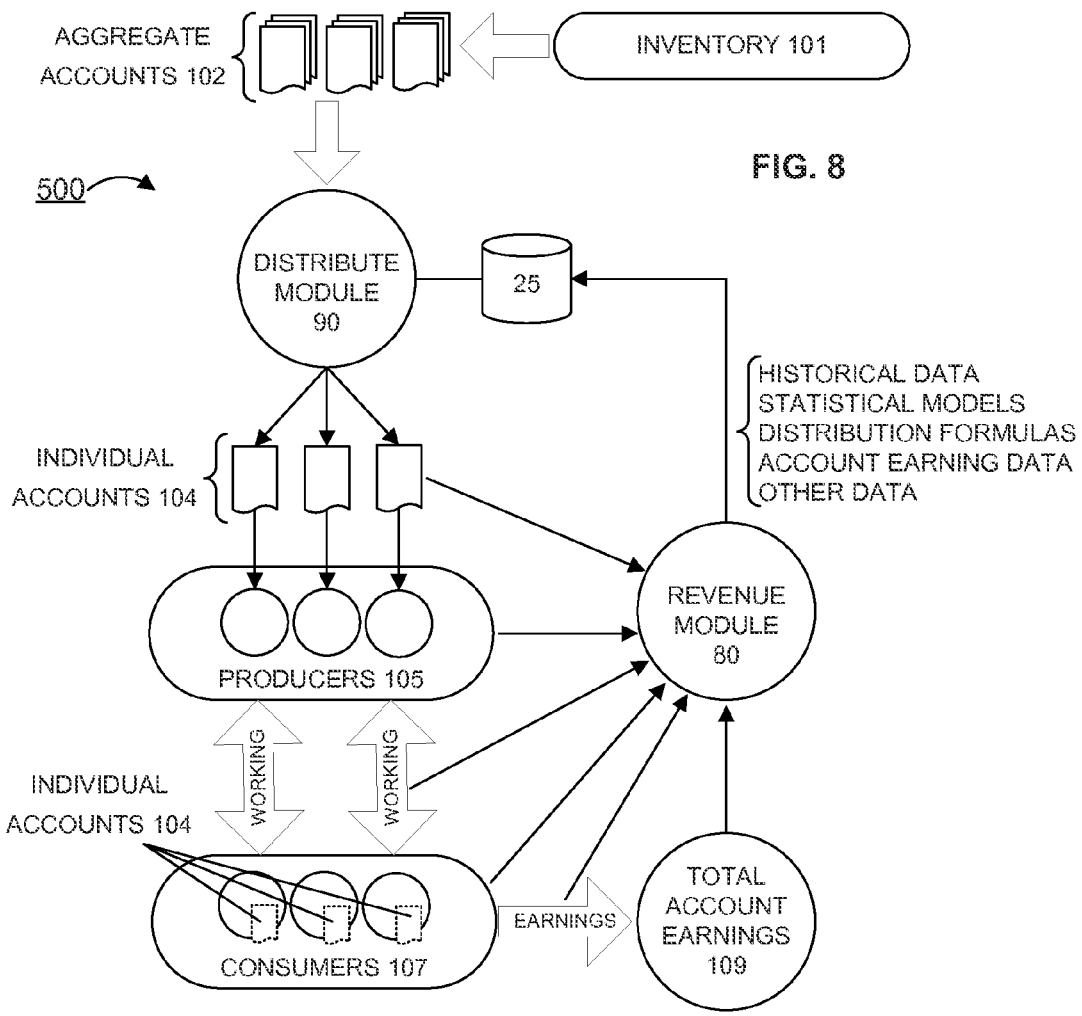
FIG. 8 is a system diagram illustrating an example system for outbound calling center inventory management according to an embodiment.

FIG. 8 is a system diagram illustrating an example system 500 for outbound calling center inventory management according to an embodiment. In the illustrated embodiment, inventory 101 comprising aggregate accounts 102 is received and processed by an inventory management server (not shown) using a distribution module 90. The distribution module 90 analyzes each of the individual accounts 104 to determine an estimated earnings value (also referred to as a fee value or inventory optimization score) for each account. The distribution module 90 also analyzes each of the individual producers 105 that will work the inventory 101 to determine the relative percentage of the inventory 101 that each producer 105 will receive so that the relative liquidation rate of each producer 105 working the inventory 101 is substantially equal. The producers 105 work each individual account 104 by contacting consumers 107 and thereby generate earnings.

Advantageously, the account information and the total account earnings 109 along with the compression strategies employed by the producers 105 when working the inventory are analyzed by the revenue model to improve future operation of the system by optimizing the underlying analysis for determining the fee value for an account and for determining the relative percentages of inventory to assign to individual producers.

In one embodiment, the system 500 illustrated in FIG. 8 is an enterprise that is a contingency collection agency environment. In that embodiment, each debt collector is a producer 105. In that embodiment, inventory 1010 is a plurality of debt accounts 104 assigned for collections by the agency, on a contingency basis, for a finite time period. In that embodiment, the system 500 provides an optimized methodology of how to distribute accounts 104 in the inventory between the producers 105 so as to maximize the overall earnings of the enterprise by driving the relative liquidation rates of the producers 105 to be substantially equal.

In the contingency collection agency embodiment, the system 500 captures in a computerized system the outcome of debt collection efforts with regard to a statistically significant sample of accounts 104 by each of the producers 105. The system 500 then uses the captured debt collection effort data to determine a formula that estimates the likely earnings of each account 104 in an inventory 101 under normal working conditions. This estimate is advantageously based on information known prior to commencement of working the accounts 104 in the inventory 101.

An example fee value formula:

$$\text{fee value[of an account]} = (\text{account balance}) * (\text{contingency rate}) * f(\text{score})$$

Where:

(a) the fee value is the projected contingency fees earnings the collection agency will generate from working the account under normal working conditions;

(b) account balance is the debt owed balance of the account;

(c) contingency rate is the percentage of collection that will be the collection agency's share;

(d) score is a known estimation of the propensity of the account to be collected, for example a credit bureau score, and (e) f(score) is a tabulated or interpolated formula that predicts the liquidation rate of an account as a function of the score of the account.

Additionally, the system 500 also uses the captured debt collection effort data to determine a formula that estimates the likely total earnings generated by each producer 105 based on the inventory 101 assigned to that producer.

An example earnings formula:

$$\text{earnings[by a producer]} = (\text{inventory}) * (\text{producer's effectiveness}) * (\text{inventory/normal capacity})^{-1/3}$$

Where:

(a) earnings is the estimated total fees that will be generated by the producers from the assigned inventory;

(b) inventory is the total of the fee value, as estimated above, of all accounts of the assigned inventory to that producer;

(c) producer's effectiveness is a derived, from the data sample, parameter for each individual producer that will best match the actual earning experienced in data sample periods with that of this formula; and (d) normal capacity is the average inventory fee value of an inventory that the producer can work in the same period of time under normal working conditions.

In the data collection agency embodiment, the system 500 employs the above two formulas to determine the optimal capacity for each producer 105. Optimal capacity for a producer 105 is the quantity of inventory, measured by fee value, that, combined with the producer's specific effectiveness, will bring the producer's earning, per unit fee value inventory, to the same level as that of the other producers 105 working the same inventory. Stated differently, optimal capacity for a producer 105 is the quantity of inventory that will drive the producer's relative liquidation rate to be substantially equal to a predetermined target relative liquidation rate. Based on the example formula above, optimal capacity is derived by:

$$\text{optimal capacity(producer)} = (\text{normal capacity}) * (\text{producer's effectiveness})^3$$

Figure 9:
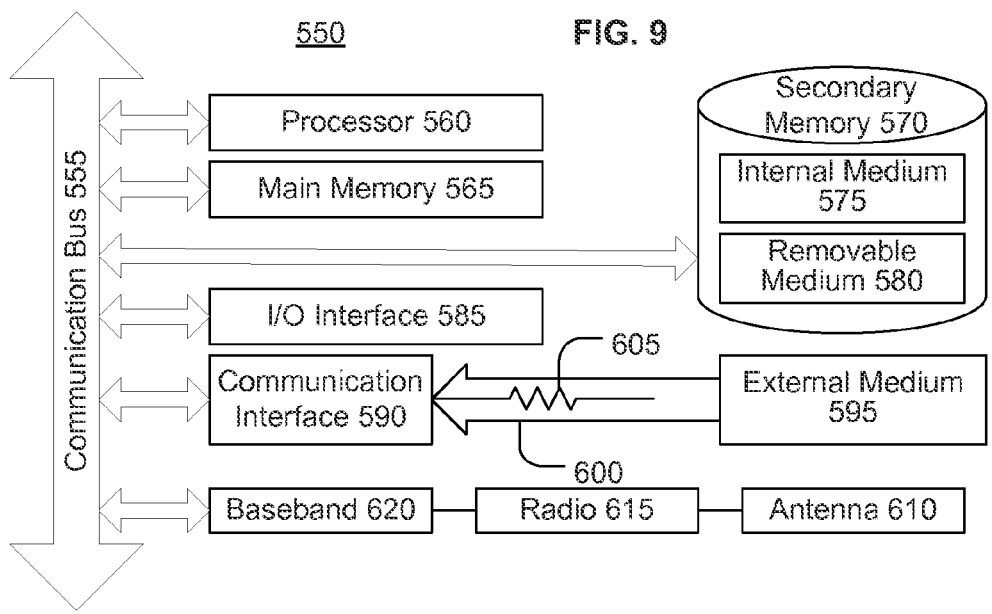
FIG. 9 is a block diagram illustrating an example wired or wireless processor enabled device that may be used in connection with various embodiments described herein.

FIG. 9 is a block diagram illustrating an example wired or wireless system 550 that may be used in connection with various embodiments described herein. For example the system 550 may be used as or in conjunction with the computerized system 111 of FIG. 1 or may be used as or in conjunction with a system implementing the distribution algorithm 103 or the statistical models 113 as previously described with respect to FIG. 1. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550.

The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the present disclosure. Thus, it is to be understood that the description and drawings presented herein represent a presently preferred embodiment and are therefore representative of the subject matter which is broadly contemplated by the present invention. It is further understood that the scope of the present invention fully encompasses other embodiments that may become obvious to those skilled in the art and that the scope of the present invention is accordingly not limited.

Alternative Embodiments

In an alternative embodiment, one or more of the models are updated as new data comes into existence. For example, the model projecting the relative value of each account based on information known prior to assignment is updated as soon as liquidation data is available. Additionally, the model projecting the future performance of each producer, based on past liquidation rate and inventory level for that producer can be updated after each received payment or even after each promise-to-pay or some combination of the two. The Compression Model, which estimates the impact of compression on the liquidation rate of any producer, is also periodically updated when liquidation data is available. Advantageously, in one embodiment all of the models can be continuously updated.

In an alternative embodiment, an adaptive-protocol system is implemented that uses a formula to increase (or decrease) each producer's inventory share relative to all other producers in proportion to their liquidation rate relative to all other producers. This is different from the primary embodiment described above in that the inventory assignment is affected as a change from the prior level, rather than a fresh optimization irrespective of prior level. Such an embodiment advantageously stabilizes at the optimal point (since that's the only point where no further changes in relative inventory assignment would be indicated). The rate of adjustment can itself also be optimized based on the dynamic behavior of the overall system. Statistical modeling may assist in optimizing the rate of adjustment. For example, too fast a rate of adjustment may cause overshooting of the optimal point and might be unstable if random fluctuations exceed the stabilization rate. Alternatively, too slow a rate of adjustment may cause the system to take longer to reach optimal performance, generating sub-optimal earnings in the interim. Advantageously, this embodiment does not require separately derived compression and producer models. On the other hand, this embodiment does not immediately identify and move to the optimal inventory assignment state.

In yet another alternative embodiment, the impact of changing staffing level (and thus modifying the compression ratio on each producer) is estimated and therefore staffing level can be optimize to the projected earnings that will be generated by existing producers under different compression conditions. For example, adding staff to work a fixed inventory will reduce the inventory available to each producer and, in accordance with the behavior predicted by the compression model, adding staff will therefore increase the liquidation rate for each producer. By aggregation, adding staff will also increase the liquidation rate for the Enterprise as a whole. However, a consequence of adding staff is that the earnings per producer will decrease. The total earnings to the Enterprise will thus increase in accordance to the compression formula as a function of the staffing level. Reducing staff will have an identical and opposite effect. Accordingly, an optimal staffing level can be achieved when the incremental cost of additional staff equals the incremental earnings such will generate. If the incremental cost of additional staff is largely constant (i.e., $X per producer per month), the optimal point occurs when the first derivative of the Earnings-as-a-function-of-staffing-count (which measures the incremental Enterprise benefit of each producer) equals that constant.

In one embodiment, staffing levels can be adjusted to meet liquidation rate goals. For example, sometimes it is necessary to meet liquidation rate goals that are not necessarily optimal (for instance to satisfy contingency client requirements). In such an embodiment, the compression model formula can advantageously be used to calculate the resulting Enterprise liquidation rate as a function of staffing level. Alternatively stated, the inverse of the compression model formula will provide the required staffing level to achieve any specifically desired liquidation rate.

In yet another embodiment, the system can be adapted to determine a price for purchasing a debt-collection portfolio. For example, when a portfolio is purchased (as opposed to being worked under contingency), the optimal staffing level may change since the earnings for a purchased portfolio are 100% of collections (as opposed to a Contingency Rate of, e.g., 30% under contingency). Accordingly, the staffing level formulation discussed above can be used to project the optimal staffing level for a purchased portfolio condition. Additionally, the compression model can also be used to compute the total collection that will be generated under the optimized staffing level. Thus, the total collection, net staffing and other costs, is the optimal net value that a purchased portfolio will generate. That net value is therefore the break-even pricing point for the portfolio and this price can be determined in advance to allow the Enterprise to analyze the portfolio, for example to compare purchasing the portfolio versus working the portfolio under contingency.

Alternative Embodiments

Advantageously, the above described embodiments can be implemented individually or in combination with any of the other embodiments described herein. Various additional alternative embodiments are also envisioned that can be implemented individually or in combination with any of the other embodiments described herein, including but not limited to:

| EMBODIMENT | DESCRIPTION |
| --- | --- |
| Debt-Buying Collection Agency (or original creditor) | Fees is set to 100% for all Accounts |
| Telemarketing | Each Account is a marketing lead. Producers are telemarketers. Earnings of an Account is the profit generated from sales to the lead. |
| Charitable fund raising | Each Account is a fund-raising lead. Producers are fund-raisers. Earnings of an Account is the funds actually raised. |
| Political Contribution Solicitation | Each Account is a contributor lead. Producers are contribution solicitors. Earnings of an Account is the contributions actually collected. |
| Religious Conversion | Each Account is an identifiable potential convert, for example a household to visit, Producers are individual missionaries. Earnings of an Account indicates that a conversion was actually achieved. In this context, the Outbound Calling may involve physical visits rather than use of a telephone. |
| Political Persuasion | Each Account is an identifiable potentially persuadable individual such as a voting citizen, lobbied elected official, lobbied public commission member, or other individual that the Enterprises wishes to persuade. Producers are individual persuaders or lobbyists. Earnings of an Account indicates that a persuasion was actually achieved. In this context, the Outbound Calling may involve physical visits and direct lobbying and not just use of a telephone. |
| Recruitment for Focus Group | Each Account is a focus-group recruitment lead. Producers are individual Focus Group Recruiters. Earnings of an Account |

| EMBODIMENT | DESCRIPTION |
| --- | --- |
| | indicates that a recruitment was actually achieved. |
| Recruitment for Clinical Trial | Each Account is a clinical trial recruitment lead, potentially an individual with a medical condition or ailment that is required for the trial. Producers are individual clinical trial Recruiters. Earnings of an Account indicates that a recruitment was actually achieved. |
| Recruitment for Class Action Lawsuit | Each Account is a clinical Class Action plaintiff lead, such as an individual harmed by the alleged action of the Class Action defendant. Producers are individual Class Action Recruiters. Earnings of an Account indicates that a recruitment was actually achieved. |
| Debt Management Company | Each Account is a debt account under management, each Agent is a professional negotiator and the Earnings of an Account are the fees to the DMC from successful negotiation. |

What is claimed is:

1. A computer implemented method, where one or more processors are programmed to perform steps comprising:
receiving an inventory comprising a plurality of accounts, wherein each account has a plurality of attributes including at least an account balance;
for each of the plurality of accounts, calculating a fee value for the account based, at least in part, on the account balance in the plurality of attributes for that account;
identifying a pool of available producers amongst which the plurality of accounts in the inventory will be assigned, wherein each producer has an associated effectiveness parameter representing a past effectiveness of the producer in liquidating accounts; and
assigning the plurality of accounts amongst the producers in said pool such that, for each of the producers in said pool, a projected relative liquidation rate for that producer is substantially equal to a projected relative liquidation rate for all other producers in said pool,
wherein the projected relative liquidation rate for each producer is based, at least in part, on the effectiveness parameter associated with that producer and on a compression ratio representing compression behavior of the producer,
wherein the compression ratio for a producer comprises a ratio between a total estimated fee value for all accounts assigned to the producer for a given time period and an average fee value of an inventory that the producer could work in the given time period under normal working conditions, and
wherein the projected relation liquidation rate for each producer is based, in part, on a power-law of the compression ratio for the producer, wherein the power-law comprises raising the compression ratio to a power of one-third.

2. The method of claim 1, wherein the fee value calculated for each account is calculated based on a global liquidation rate associated with a score in the plurality of attributes for that account.

3. The method of claim 1, wherein the fee value calculated for each account is calculated based on a specific liquidation rate determined from historical inventory information comprising related accounts.

4. The method of claim 1, wherein assigning the plurality of accounts comprises assigning a different amount of accounts to a first one of the producers in said pool than to a second one of the producers in said pool.

5. The method of claim 4, wherein the amount of accounts assigned to the first producer and the amount of accounts assigned to the second producer are each based on a capacity of the respective producer, and wherein the capacity for each producer is based on historical performance of that producer.

6. The method of claim 1, wherein, for each of the plurality of accounts, calculating a fee value for the account comprises calculating a base liquidation rate for each account based, at least in part, on a score in the plurality of attributes for that account, wherein the fee value is further based on the calculated base liquidation rate, and wherein the score represents an estimate of the propensity of the account to be collected.

7. A system comprising:
a non-transitory computer readable medium configured to store executable programmed modules;
a processor communicatively coupled with the non-transitory computer readable medium configured to execute programmed modules stored therein;
one or more programmed modules stored in the non-transitory computer readable medium and configured to be executed by the processor, the one or more programmed modules configured to
receive an inventory comprising a plurality of accounts, wherein each account has a plurality of attributes including at least an account balance,
for each of the plurality of accounts, calculate a fee value for the account based, at least in part, on the account balance in the plurality of attributes for that account,
identify a pool of available producers amongst which the plurality of accounts in the inventory will be assigned, wherein each producer has an associated effectiveness parameter representing a past effectiveness of the producer in liquidating accounts, and
assign the plurality of accounts amongst the producers in said pool such that, for each of the producers in said pool, a projected relative liquidation rate for that producer is substantially equal to a projected relative liquidation rate for all other producers in said pool,
wherein the projected relative liquidation rate for each producer is based, at least in part, on the effectiveness parameter associated with that producer and on a compression ratio representing compression behavior of the producer,
wherein the compression ratio for a producer comprises a ratio between a total estimated fee value for all accounts assigned to the producer for a given time period and an average fee value of an inventory that the producer could work in the given time period under normal working conditions, and wherein the projected relation liquidation rate for each producer is based, in part, on a power-law of the compression ratio for the producer, wherein the power-law comprises raising the compression ratio to a power of one-third.

8. The system of claim 7, wherein the fee value calculated for each account is calculated based on a global liquidation rate associated with a score in the plurality of attributes for that account.

9. The system of claim 7, wherein the fee value calculated for each account is calculated based on a specific liquidation rate determined from historical inventory information comprising related accounts.

10. The system of claim 7, wherein assigning the plurality of accounts comprises assigning a different amount of accounts to a first one of the producers in said pool than to a second one of the producers in said pool.

11. The system of claim 10, wherein the amount of accounts assigned to the first producer and the amount of accounts assigned to the second producer are each based on a capacity of the respective, and wherein the capacity of each producer is based on historical performance of that producer.

12. The system of claim 7, wherein, for each of the plurality of accounts, calculating a fee value for the account comprises calculating a base liquidation rate for each account based, at least in part, on a score in the plurality of attributes for that account, wherein the fee value is further based on the calculated base liquidation rate, and wherein the score represents an estimate of the propensity of the account to be collected.

* * * * *